United States Patent
Ponath et al.

(10) Patent No.: US 9,631,994 B2
(45) Date of Patent: Apr. 25, 2017

(54) METHOD FOR JOINING CERAMIC BODIES BY MEANS OF AN ACTIVE HARD SOLDER, OR BRAZE, ASSEMBLY HAVING AT LEAST TWO CERAMIC BODIES JOINED WITH ONE ANOTHER, ESPECIALLY A PRESSURE MEASURING CELL

(71) Applicant: Endress + Hauser GmbH + Co. KG, Maulburg (DE)

(72) Inventors: Nils Ponath, Lorrach (DE); Andreas Rossberg, Bad Sackingen (DE); Elke Schmidt, Bad Sackingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 185 days.

(21) Appl. No.: 14/413,470

(22) PCT Filed: Jun. 7, 2013

(86) PCT No.: PCT/EP2013/061809
§ 371 (c)(1),
(2) Date: Jan. 8, 2015

(87) PCT Pub. No.: WO2014/009070
PCT Pub. Date: Jan. 16, 2014

(65) Prior Publication Data
US 2015/0160086 A1    Jun. 11, 2015

(30) Foreign Application Priority Data

Jul. 11, 2012   (DE) ................. 10 2012 106 236

(51) Int. Cl.
*G01L 9/00*    (2006.01)
*B23K 1/00*    (2006.01)
(Continued)

(52) U.S. Cl.
CPC .......... *G01L 9/0072* (2013.01); *B23K 1/0008* (2013.01); *B23K 1/0016* (2013.01);
(Continued)

(58) Field of Classification Search
CPC .......... C04B 2237/12; C04B 2237/122; C04B 2237/126; C04B 2237/343;
(Continued)

(56) References Cited

U.S. PATENT DOCUMENTS 2,857,663 A * 10/1958 Beggs ................. C04B 37/006
                                                   220/2.3 R
3,150,446 A *  9/1964 Todd ....................... B23K 1/18
                                                       228/164

(Continued)

FOREIGN PATENT DOCUMENTS

CN    1637663 A    7/2005
CN   101479586 A   7/2009
(Continued)

OTHER PUBLICATIONS

International Search Report, EPO, The Netherlands, Dec. 6, 2013.
(Continued)

*Primary Examiner* — David Bolduc
(74) *Attorney, Agent, or Firm* — Bacon & Thomas, PLLC

(57) ABSTRACT

An assembly, comprising: a first ceramic body and a second ceramic body connected by means of a joint of an active hard solder, or braze, wherein the active hard solder, or braze, averaged over a continuous main volume, which includes at least 50% of the volume of the joint, has an average composition $C_M$ with a liquidus temperature $T_l(C_M)$. An edge region of the joint, which contacts at least one of the ceramic bodies, has an average composition $C_E$ with a liquidus temperature $T_l(C_E)$, which lies not less than 20 K, preferably not less than 50 K, and especially preferably not less than 100 K above the liquidus temperature $T_l(C_M)$ of the average composition $C_M$ of the main volume.

45 Claims, 1 Drawing Sheet

(51) Int. Cl.
 *B23K 1/19* (2006.01)
 *C04B 37/00* (2006.01)
(52) U.S. Cl.
 CPC .............. *B23K 1/19* (2013.01); *C04B 37/006*
 (2013.01); *G01L 9/0044* (2013.01); *G01L*
 *9/0075* (2013.01); *C04B 2237/12* (2013.01);
 *C04B 2237/122* (2013.01); *C04B 2237/126*
 (2013.01); *C04B 2237/343* (2013.01); *C04B*
 *2237/55* (2013.01); *C04B 2237/597* (2013.01);
 *C04B 2237/708* (2013.01); *C04B 2237/72*
 (2013.01); *Y10T 403/479* (2015.01)
(58) Field of Classification Search
 CPC .......... C04B 2237/55; C04B 2237/597; C04B
 2237/708; C04B 2237/72; C04B 37/003;
 C04B 37/006; Y10T 403/479; G01L
 9/0072; G01L 9/0075; G01L 9/0044;
 B23K 1/0008; B23K 1/0016; B23K 1/19
 See application file for complete search history.

(56) References Cited

U.S. PATENT DOCUMENTS

| | | | | |
|---|---|---|---|---|
| 4,034,454 A * | 7/1977 | Galasso | ............... | B23K 35/005 228/194 |
| 4,148,669 A * | 4/1979 | Tanner | ................... | H01C 3/005 148/538 |
| 4,944,187 A * | 7/1990 | Frick | ..................... | G01L 9/0042 338/4 |
| 5,050,034 A * | 9/1991 | Hegner | ................. | G01L 9/0075 177/210 C |
| 5,334,344 A | 8/1994 | Hegner | | |
| 5,366,000 A | 11/1994 | Reimann | | |
| 5,400,489 A * | 3/1995 | Hegner | ................... | C03C 17/25 228/121 |
| 5,407,119 A * | 4/1995 | Churchill | ............ | B23K 1/0056 219/121.64 |
| 5,534,103 A * | 7/1996 | Yano | ..................... | C04B 37/025 156/272.2 |
| 5,539,611 A * | 7/1996 | Hegner | ................. | C04B 37/026 174/152 GM |
| 5,600,530 A * | 2/1997 | Smith | ................... | B23K 1/0008 361/234 |
| 5,618,359 A * | 4/1997 | Lin | ......................... | C22C 45/10 148/403 |
| 5,916,520 A * | 6/1999 | Maruyama | ................ | C22C 5/06 420/492 |
| 5,954,900 A * | 9/1999 | Hegner | ................. | C04B 35/645 156/306.6 |
| 6,039,918 A | 3/2000 | Hegner et al. | | |
| 6,221,511 B1 * | 4/2001 | Sakuraba | ................ | B32B 18/00 228/122.1 |
| 6,267,009 B1 | 7/2001 | Drewes et al. | | |
| 6,268,069 B1 * | 7/2001 | Ohashi | ................. | B23K 35/302 228/121 |
| 6,578,427 B1 * | 6/2003 | Hegner | ............... | G01L 19/0654 73/718 |
| 7,121,717 B2 | 10/2006 | Grippo et al. | | |
| 7,503,220 B2 | 3/2009 | Sittler et al. | | |
| 7,565,996 B2 * | 7/2009 | Das | ........................ | B23K 20/02 228/246 |
| 7,781,696 B2 * | 8/2010 | Schreiber | ............. | B23K 1/0008 219/121.64 |
| 7,814,798 B2 * | 10/2010 | Filippi | ................ | G01L 19/0645 73/715 |
| 8,056,606 B2 * | 11/2011 | Hasz | ........................ | G01B 7/14 164/34 |
| 8,264,129 B2 | 9/2012 | Krohn et al. | | |
| 9,011,620 B2 * | 4/2015 | Fernie | .................. | B23K 20/021 156/89.11 |
| 9,136,662 B2 | 9/2015 | Rossberg et al. | | |
| 2001/0015105 A1 * | 8/2001 | Gerst | ..................... | G01L 9/0075 73/715 |
| 2002/0026836 A1 * | 3/2002 | Hegner | ................. | G01L 9/0075 73/717 |
| 2004/0040654 A1 * | 3/2004 | Masuda | .................. | C30B 29/20 156/308.6 |
| 2005/0103109 A1 * | 5/2005 | Hegner | ................. | G01L 9/0075 73/706 |
| 2009/0020499 A1 * | 1/2009 | Nottola | .................... | G02B 6/42 216/2 |
| 2009/0066190 A1 * | 3/2009 | Harima | ................ | H03H 9/0519 310/348 |
| 2010/0146771 A1 * | 6/2010 | Bertsch | .................... | C04B 35/10 29/595 |
| 2010/0199778 A1 * | 8/2010 | Hegner | ................. | G01L 9/0075 73/724 |
| 2011/0041618 A1 * | 2/2011 | Hegner | ................. | C04B 41/009 73/716 |
| 2011/0132097 A1 * | 6/2011 | Hegner | ................. | G01L 9/0075 73/715 |
| 2011/0206912 A1 | 8/2011 | Au | | |
| 2012/0174681 A1 * | 7/2012 | Drewes | ................. | G01L 9/0075 73/724 |
| 2013/0004235 A1 * | 1/2013 | Chaumat | ............... | C04B 37/005 403/272 |
| 2013/0011185 A1 * | 1/2013 | Chaumat | ............. | B23K 1/0008 403/272 |
| 2013/0064602 A1 * | 3/2013 | Chaumat | ............. | B23K 1/0008 403/272 |
| 2013/0213138 A1 | 8/2013 | Rossberg | | |
| 2013/0263670 A1 | 10/2013 | Selders et al. | | |

FOREIGN PATENT DOCUMENTS

| | | | | |
|---|---|---|---|---|
| CN | 102346022 A | 2/2012 | | |
| DE | CA 2282926 A1 * | 3/2000 | .......... | B23K 35/025 |
| DE | CA 2302078 A1 * | 9/2000 | .......... | G01L 9/0075 |
| DE | 10036433 A1 | 2/2002 | | |
| DE | 102004015989 A1 | 10/2005 | | |
| DE | 102010043119 A1 | 5/2012 | | |
| DE | WO 2012110023 A1 * | 8/2012 | ............ | H05K 3/341 |
| DE | WO 2012123199 A1 * | 9/2012 | ............ | C04B 35/111 |
| EP | 0490807 A2 | 6/1992 | | |
| EP | 0558874 B1 | 9/1993 | | |
| EP | 1010973 A1 | 6/2000 | | |
| JP | 55103277 A * | 8/1980 | | |
| JP | 2001342081 A | 12/2001 | | |
| WO | 2012055989 A1 | 5/2012 | | |
| WO | 2012079939 A1 | 6/2012 | | |

OTHER PUBLICATIONS

German Search Report, German Patent Office, Munich, Mar. 5, 2013.

English Translation of the International Preliminary Report on Patentability, WIPO, Geneva, Jan. 22, 2015.

* cited by examiner

METHOD FOR JOINING CERAMIC BODIES BY MEANS OF AN ACTIVE HARD SOLDER, OR BRAZE, ASSEMBLY HAVING AT LEAST TWO CERAMIC BODIES JOINED WITH ONE ANOTHER, ESPECIALLY A PRESSURE MEASURING CELL

TECHNICAL FIELD

The present invention relates to an assembly, which has at least two ceramic bodies joined with one another, especially a pressure measuring cell, as well as to a method for joining ceramic bodies by means of an active hard solder, or braze.

BACKGROUND DISCUSSION

Due to the special relevance of the invention for pressure measurement cells, the invention will first be explained based on pressure measurement cells.

Pressure measurement cells according to the state of the art combine a ceramic measuring membrane and a ceramic platform, wherein the measuring membrane is connected pressure-tightly with the platform along a peripheral joint, which contains an active hard solder, or braze, wherein a pressure chamber is formed between the measuring membrane and the platform, wherein the equilibrium position of the measuring membrane results from the difference between a pressure reigning in the pressure chamber and a pressure acting on the outside of the measuring membrane facing away from the pressure chamber.

Serving as material for the platform and the measuring membrane are especially aluminum oxide ceramics, which, due to their elastic properties and their media resistance, are suited for manufacture of pressure measurement cells. The mentioned ceramic components are especially joined with an active hard solder, or braze, which is preferably an active hard solder, or braze containing Zr, Ni and Ti. The manufacture of such an active hard solder, or braze, is disclosed, for example, in European Offenlegungsschrift (laid open application) EP 0 490 807 A2. According to the method described there, especially rings of the active braze material can be manufactured, which are positioned between measuring membrane and platform, in order to solder, or braze, these with one another.

The molten active hard solder, or braze, tends, however, to flow radially inwards. Thus, additional measures are required, in order to avoid this. In this regard, for example, Offenlegungsschrift (laid open application) DE 100 36 433 AI discloses a capacitive pressure measuring cell, which likewise has a joint with an active hard solder, or braze, wherein at the joint root, thus the inner radius of the joint, a ring-shaped surrounding groove is formed, which, on the one hand, prevents localized stress concentrations at the joint and, on the other hand, defines a reliable solder stop, via which the active hard solder, or braze cannot flow further radially inwards.

A practiced method for limiting the radially inwards flowing of active hard solder, or braze involves oxidizing the surface of a membrane-side electrode, which contains tantalum, and which is intended for galvanic contact with the active hard solder, or braze. At relatively low solder temperatures, this can prevent a running of the active hard solder, or braze, into the pressure chamber and provides an acceptable yield. When, however, the soldering temperature is increased, this solder stop is no longer reliable, and the solder flows over the edge of the tantalum electrode into the pressure chamber.

In the yet unpublished patent application DE 10 2012 103 166, a graphite layer is disclosed as solder stop.

Defects in the graphite layer can, however, in given cases, degrade the wetting prevention. It is, therefore, an object of the present invention to provide an assembly, respectively a pressure measuring cell, in whose manufacture a flowing of the solder past a solder stop is reliably prevented.

The object is achieved according to the invention by the assembly which includes a first ceramic body and a second ceramic body, wherein the first ceramic body and the second ceramic body are connected by means of a joint, wherein the joint contains an active hard solder, or braze, wherein the active hard solder, or braze, averaged over a continuous main volume, which includes at least 50%, especially at least 70% and preferably at least 80%, of the volume of the joint, has an average composition $C_M$ with a liquidus temperature $T_l(C_M)$, wherein $C_M:=(c_{M1}, \ldots, c_{MN})$, wherein $|C_M|=1$, and wherein the $c_{Mi}$ are the stoichiometric fractions of the components $K_i=1, \ldots, N$ of the average composition of the active hard solder, or braze in the main volume, wherein according to the invention an edge region of the joint, which contacts at least one of the ceramic bodies, and which overlaps no more than 8% of the main volume, for example, no more than 4% and especially no more than 2% and preferably lies outside of the main volume, has an average composition $C_E$ with a liquidus temperature $T_l(C_E)$, which lies not less than 20 K, preferably not less than 50 K, and especially preferably not less than 100 K above the liquidus temperature $T_l(C_M)$ of the average composition $C_M$ of the main volume, wherein $C_E:=(c_{E1}, \ldots, c_{EN})$, wherein $|C_E|=1$, and wherein the $c_{Ei}$ are the stoichiometric fractions of the components $K_i=1, \ldots, N$ of the average composition of the active hard solder, or braze, in the edge region.

In a further development of the invention, the edge region with the average composition $C_E$ has a volume, which amounts to not less than 0.1%, for example, not less than 0.5% and especially not less than 1% of the volume of the joint.

In a further development of the invention, the joint is ring-shaped, wherein the main volume is defined by a body of revolution, which is formed by rotation of a convex polygon, especially a rectangle, about the principal axis of rotation of the ring.

In a further development of the invention, the edge region with composition $C_E$ extends along the inner edge of the annular joint.

In a further development of the invention, the liquidus temperature of $T_l(C_M)$ rises monotonically to the liquidus temperature $T_l(C_E)$ with change of composition from $C_M$ to $C_E$.

In a further development of the invention, the composition $C_M$ has a liquidus temperature $T_l(C_M)$, which lies no more than 300 K, preferably no more than 150 K, and preferably no more than 50 K above the liquidus temperature $T_l(C_e)$ of the eutectic point, respectively the nearest intersection with a eutectic valley with a composition $C_e$ in the composition space, wherein $C_e:=(c_{e1}, \ldots, c_{eN})$, wherein $|C_e|=1$, and wherein the $c_{ei}$ are the stoichiometric fractions of the components $K_i$ with $i=1, \ldots, N$ at the eutectic point, respectively a nearest intersection with a eutectic valley.

The nearest intersection with a eutectic valley is defined by a point in a eutectic valley, for whose composition $C_e$ it holds that the magnitude of the vector difference $|C_e - C_M|$ has a minimum among all points in eutectic valleys.

In a further development of the invention, the alloy of the joint has at the eutectic point, respectively at the nearest intersection with a eutectic valley in the composition space, a composition $C_e$, wherein $C_e:=(c_{e1}, \ldots, c_{eN})$, wherein $|C_e|=1$, wherein the $c_{ei}$ are the stoichiometric fractions of the components $K_i$ with $i=1, \ldots, N$ at the eutectic point, respectively at the nearest intersection with a eutectic valley, wherein the difference between the composition $C_e$ and the composition $C_M$ is describable with a normalized vector difference $D_{eM}$, wherein: $C_e=C_M+a_{eM}*D_{eM}$, with $|D_{eM}|=1$, wherein the difference between the composition $C_E$ and the composition $C_M$ is describable with a normalized vector difference $D_{EM}$, wherein: $C_E=C_M+a_{EM}*D_{EM}$, with $|D_{EM}|=1$, wherein $a_{eM}$ and $a_{EM}$ are positive scalars, wherein for the scalar product $s_{eE}$: $=D_{eM} \cdot D_{EM}$: $s_{eE}<0$, especially $s_{eE}<-0.5$, preferably $s_{eE}<-0.8$.

In a further development of the invention, the first ceramic body and/or the second ceramic body comprises $Al_2O_3$.

In a further development of the invention, the active hard solder, or braze, contains Zr, Ni and Ti, wherein in an embodiment of the invention the active hard solder, or braze, at least in the main volume, is composed of these components and, in given cases, aluminum, which in the soldering process diffuses from the ceramic into the joint.

In an embodiment of this further development of the invention, the composition $C_M$ comprises 20 atom-% to 24 atom-% Ni, 13 atom-% to 17 atom-% Ti and remainder Zr, as well as, in given cases, aluminum, which diffuses in the soldering process from the ceramic into the joint, wherein the composition $C_M$ especially comprises 63 atom-% Zr, 22 atom-% Ni and 15 atom-% Ti, wherein, in given cases, Al diffuses in, wherein in the cases when Al is present, especially the titanium fraction is reduced, and wherein the composition $C_E$ has compared with the composition $C_M$ an increased Ni fraction.

In a further development of the invention, the composition $C_E$ of the edge region contains the same metals as the composition $C_M$ of the main volume. In an embodiment of this further development of the invention, the compositions contain, apart from, in given cases, impurities, no additional elements. In another further development of the invention, the composition of the edge region contains at least one further metal selected from a list, which includes Cu, Fe, Al, Ag and Au.

The pressure measuring cell of the invention comprises an assembly of the invention, wherein the first ceramic body is a membrane body of a measuring membrane of the pressure measuring cell, and wherein the second ceramic body is a platform of the pressure measuring cell, wherein the platform and the measuring membrane are joined pressure-tightly with one another by means of the joint, which is ring-shaped.

In a further development, the pressure measuring cell includes a capacitive transducer, wherein a surface of the platform facing the measuring membrane and/or the surface of the measuring membrane facing the platform have, respectively has, a metal electrode, wherein the electrode comprises a metal, which is enriched in the composition $C_E$ in comparison to the composition $C_M$. In a further development of the invention, this metal comprises nickel.

The method of the invention for manufacturing an assembly of a first ceramic body and a second ceramic body, wherein the first ceramic body and the second ceramic body are to be joined by means of an active hard solder, or braze, comprises steps as follows: Providing the active hard solder, or braze, and a solder stop between the ceramic bodies, wherein the active hard solder, or braze, before the soldering, has, averaged over a continuous main volume, which includes at least 50%, especially at least 70% and preferably at least 80% of the volume of the active hard solder, or braze, an average composition $C_{M0}$ with a liquidus temperature $T_l(C_{M0})$, wherein $C_{M0}:=(c_{M01}, \ldots, c_{M0N})$, wherein $|C_{M0}|=1$, and wherein the $c_{M0i}$ are the stoichiometric fractions of the components $K_i$ $i=1, \ldots, N$ of the average composition of the active hard solder, or braze, in the main volume, wherein the solder stop has at least one material, whose liquidus temperature lies above the liquidus temperature of the composition $C_{M0}$ of the main volume, and wherein a mixing of the material of the solder stop with the composition $C_{M0}$ leads, at least in the edge region of a joint to be formed by the method, to an average composition $C_E$, wherein the composition $C_E$ has a liquidus temperature $T_l(C_E)$, which lies not less than 20 K, preferably not less than 50 K, and especially preferably not less than 100 K above the liquidus temperature $T_l(C_{M0})$ of the average composition $C_{M0}$ of the main volume, wherein $C_E:=(c_{E1}, \ldots, c_{EN})$, wherein $|C_E|=1$, and wherein the $c_{Ei}$ are the stoichiometric fractions of the components $K_i$ $i=1, \ldots, N$ of the average composition of the active hard solder, or braze, in the edge region; and heating the ceramic bodies, the active hard solder, or braze, and the solder stop in a vacuum soldering, brazing process, at least up to melting of the composition $C_M$, wherein the melt in the edge region of the active hard solder, or braze, mixes with the material of the solder stop, whereby the melt in the edge region isothermally solidifies or becomes more viscous, and stops. Stopping means, in this connection, that a flowing of the active hard solder, or braze, to the extent that it happens, ceases in the edge region.

In a further development of the method, the active hard solder, or braze, comprises Zr, Ni and Ti.

In a further development of the invention, the composition $C_{M0}$ of the active hard solder, or braze, comprises, before the joining, 20 atom-% to 24 atom-% Ni, 13 atom-% to 17 atom-% Ti, remainder Zr, wherein the composition $C_M$ comprises especially 63 atom-% Zr, 22 atom-% Ni and 15 atom-% Ti.

In a further development of the invention, the composition $C_E$ has, compared with the composition $C_M$, thus, that of the main volume of the joint, after the joining, an increased Ni fraction.

In a further development of the invention, the solder stop is provided by depositing a metal or a mixture of various metals on at least one surface section of at least one ceramic body, wherein an enrichment of the metal or the mixture of metals in the active hard solder, or braze, leads to an increased liquidus temperature compared with the liquidus temperature of the composition of the main volume of the active hard solder, or braze.

In a further development of the invention, the deposited metal, respectively the mixture of deposited metals, contains nickel.

In a further development of the invention, the surface section of the ceramic body, in which the solder stop is provided, overlaps the contact surface between the joint and the ceramic body no more than 25%, preferably no more than 10%, of the contact surface between the joint and the ceramic body.

BRIEF DESCRIPTION OF THE DRAWINGS

The invention will now be explained based on the example of an embodiment illustrated in the drawing, the figures of which show as follows.

DETAILED DISCUSSION IN CONJUNCTION WITH THE DRAWINGS

Figure 1:
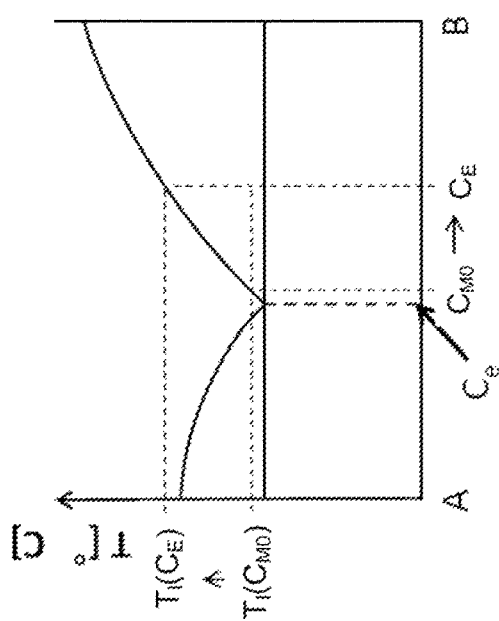
FIG. 1 is a section through an example of a phase diagram for a binary alloy.

As shown in FIG. 1, an alloy, which is composed of a mixture of two metals or two alloys A and B, has a eutectic point, respectively an intersection with a eutectic valley, at a composition $C_e$. In the vicinity of this composition $C_e$, a composition $C_{M0}$ has, compared with $C_e$, a somewhat increased amount of component B, which, compared with the composition $C_e$, has an only slightly increased liquidus temperature. A further enrichment of the component B leads to a significantly increased liquidus temperature, such as, for example, indicated for the composition $C_E$.

Figure 2:
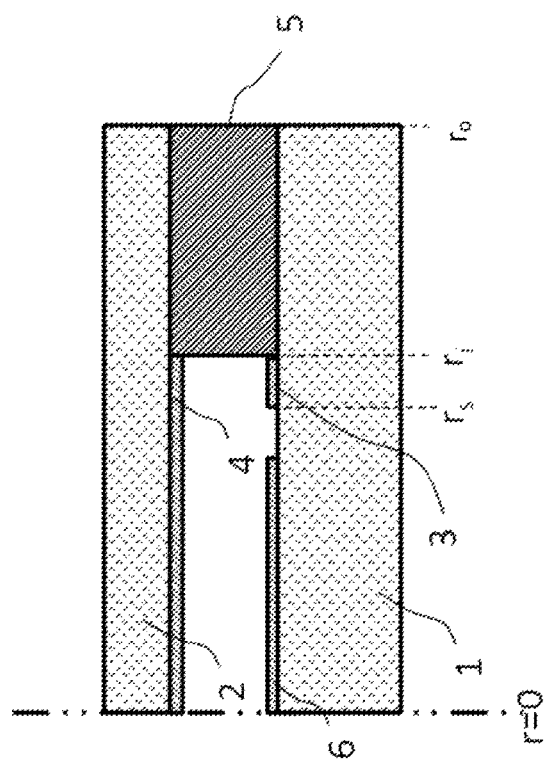
FIG. 2 is a longitudinal section through a pressure measuring cell of the invention.

Starting from these considerations, the components of a pressure measuring cell will be joined. The arrangement of the components before joining are presented in FIG. 2. The pressure measuring cell includes a ceramic platform 1 and a measuring membrane 2, both of which comprise aluminum oxide. The measuring membrane 2 and the platform are to be joined by means of an active hard solder, or braze. In order to keep the active hard solder, or braze, in a defined region, there is deposited on a surface of the platform 1 facing the measuring membrane 2, for example, by sputtering, an annular solder stop 3 which has, for example, a radial dimension $r_i$-$r_s$ of, for instance, 0.5 mm. The coating thickness of the solder stop amounts to, for example, 0.1 μm to 0.5 μm. The solder stop can especially comprise nickel. A corresponding solder stop 4 is deposited on a surface of the measuring membrane 2 facing the platform 1, wherein the membrane-side solder stop 4 on the measuring membrane 2 especially can be formed as a full surface, circular disk, in order therewith at the same time to serve as a membrane-side electrode of a capacitive transducer. Also, the membrane-side solder stop 4 can comprise nickel in a thickness of, for example, 0.1 μm to 0.5 μm.

During the preparation of the solder stop 3 on the platform, at the same time, at least one platform-side measuring electrode 6 of the capacitive transducer can be deposited. Especially, measuring electrode 6 is of the same material as the solder stop 4. The platform-side measuring electrode 6 should, however, be galvanically isolated from the platform-side solder stop 4.

Figure 3A:
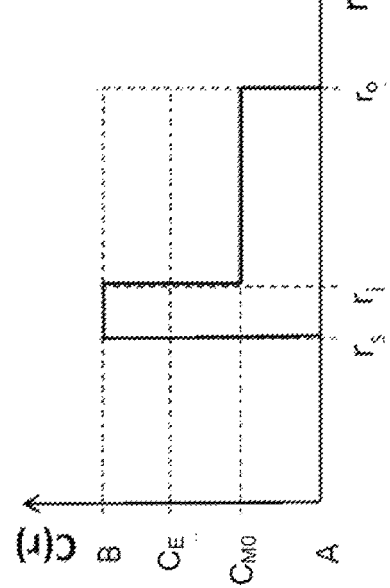
FIG. 3a is a composition distribution C(r) before the melting of the alloy of the active hard solder, or braze.
Figure 3B:
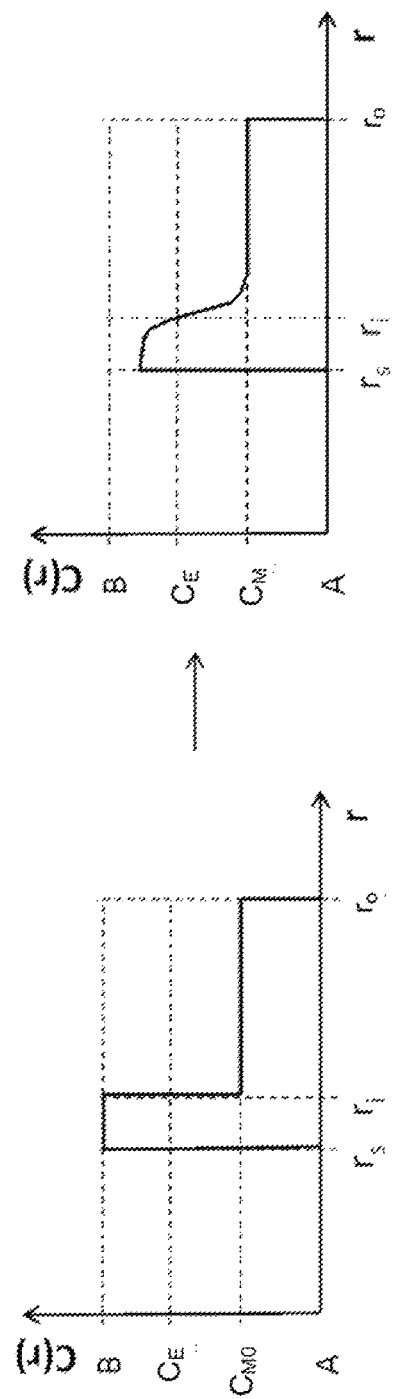
FIG. 3b is a composition distribution C(r) after the joining process.

For preparing the connection, then an active hard solder, or braze, ring 5 is provided between the platform and the measuring membrane, which extends outwards from $r_i$ to $r_a$. Ring 5 comprises, for example, a ternary Zr—Ni—Ti active hard solder, or braze, having a composition $C_{M0}$ of especially 63 atom-% Zr, 22 atom-% Ni and 15 atom-% Ti. This hard solder, or braze, has a liquidus temperature $T_l(C_{M0})$ of, for instance, 870° C. With reference to FIG. 1, the sub composition of Zr and Ti is considered to be component A, while Ni is component B. The composition C(r) of the metal components on the surface of the platform before the melting of the active hard solder, or braze, is shown as a function of radius in FIGS. 3a and 3b. In the region of the solder stop of Ni, accordingly exclusively present is the component B, while in the region of the ring of active hard solder, or braze, a mixture of A and B is present as the composition $C_{M0}$. After heating of the arrangement of FIG. 2 in a high vacuum soldering process to a soldering, brazing temperature of, for instance, 890° C., the active hard solder, or braze, ring 5 melts, and its active component Ti reacts with the ceramic material of the measuring membrane and of the platform. At the same time, at the interface between the active hard solder, or braze, and the solder stop, nickel from the solder stop migrates into the melt, wherein through local enrichment of nickel there arises in the edge region a composition $C_E$, whose liquidus temperature $T_l(C_E)$ lies above the current soldering temperature. Thereupon, the melt in the edge region solidifies, whereby a further inflowing of the active hard solder, or braze, is reliably prevented. Actually, as a result of the soldering process aluminum from the ceramic can diffuse both into the main volume as well as also into the edge region, while titanium from the active hard solder, or braze, diffuses into the ceramic, so that the composition $C_E$ of the edge region can furthermore contain Al in addition to the metals of the solder stop and of the active hard solder, or braze, whereby the composition $C_M$ of the main volume can additionally contain after the soldering, besides the elements in the composition $C_{M0}$ of the active hard solder or braze before the soldering, also aluminum.

The invention claimed is:

1. An assembly, comprising:
   a first ceramic body; and
   a second ceramic body, wherein:
   said first ceramic body and said second ceramic body are connected by means of a joint, said joint contains an active hard solder, or braze;
   said active hard solder, or braze, averaged over a continuous main volume, which includes at least 50% of the volume of the joint, has an average composition $C_M$ with a liquidus temperature $T_l(C_M)$, wherein $C_M$:= $(c_{M1}, \ldots, c_{MN})$, wherein $|C_M|=1$, and wherein the $c_{Mi}$ are the stoichiometric fractions of the components $K_i$ i=1, ..., N of the average composition of the active hard solder, or braze, in the main volume; and
   an edge region of said joint, which contacts at least one of said ceramic bodies and which overlaps no more than 8% of the main volume, has an average composition $C_E$ with a liquidus temperature $T_l(C_E)$, which lies not less than 20 K, above the liquidus temperature $T_l(C_M)$ of the average composition $C_M$ of the main volume, wherein $C_E$:=$(c_{E1}, \ldots, c_{EN})$, wherein $|C_E|=1$, and wherein the $c_{Ei}$ are the stoichiometric fractions of the components $K_i$ i=1, ..., N of the average composition of the active hard solder, or braze, in the edge region.

2. The assembly as claimed in claim 1, wherein:
   the edge region with the average composition $C_E$ has a volume, which amounts to not less than 0.1% of the volume of the joint.

3. The assembly as a claimed in claim 1, wherein:
   said joint is ring-shaped; and
   the main volume is defined by a body of revolution, which is formed by rotation of a convex polygon, especially a rectangle, about the principal axis of rotation of said ring-shaped joint.

4. The assembly as claimed in claim 3, wherein:
   the edge region with composition $C_E$ extends along the inner edge of said ring-shaped joint.

5. The assembly as claimed in claim 1, wherein:
   the liquidus temperature of $T_l(C_M)$ rises monotonically to the liquidus temperature $T_l(C_E)$ with change of composition from $C_M$ to $C_E$.

6. The assembly as claimed in claim 1, wherein:
   the composition $C_M$ has a liquidus temperature $T_l(C_M)$, which lies no more than 300 K, above the liquidus temperature $T_l(C_e)$ of a eutectic point, respectively of a nearest intersection with a eutectic valley with a composition $C_e$ in the composition space, wherein $C_e:=(c_{e1}, \ldots, c_{eN})$, wherein $|C_e|=1$, and wherein the $c_{ei}$ are the stoichiometric fractions of the components $K_i$ with $i=1, \ldots, N$ at the eutectic point, respectively a nearest intersection with a eutectic valley.

7. The assembly as claimed in claim 1, wherein:
an alloy of said joint has at an eutectic point, respectively at the nearest intersection with a eutectic valley in the composition space a composition $C_e$, wherein $C_e := (c_{e1}, \ldots, c_{eN})$, wherein $|C_e|=1$, wherein the $c_{ei}$ are the stoichiometric fractions of the components $K_i$ with $i=1, N$ at the eutectic point, respectively at the nearest intersection with a eutectic valley;
the difference between the composition $C_e$ and the composition $C_M$ is describable with a normalized vector difference $D_{eM}$, wherein: $C_e=C_M+a_{eM}*D_{eM}$, with $|D_{eM}|=1$; and
wherein the difference between the composition $C_E$ and the composition $C_M$ is describable with a normalized vector difference $D_{EM}$, wherein: $C_E=C_M+a_{EM}*D_{EM}$, with $|D_{EM}|=1$, wherein $a_{eM}$ and $a_{EM}$ are positive scalars, wherein for the scalar product $S_{eE}:=D_{eM}\cdot D_{EM}$: $S_{eE}<0$.

8. The assembly as claimed in claim 1, wherein:
the composition $C_E$ of the edge region contains the same metals as the composition $C_M$ of the main volume or other metals.

9. The assembly as claimed in claim 1, wherein:
said first ceramic body and/or said second ceramic body comprises $Al_2O_3$.

10. The assembly as claimed in claim 1, wherein said active hard solder, or braze, contains Zr, Ni and Ti.

11. The assembly as claimed in claim 10, wherein:
the composition $C_M$ comprises 20 atom-% to 24 atom-% Ni, 13 atom-% to 17 atom-% Ti and remainder Zr, and aluminum, which diffuses in the soldering process from the ceramic into said joint;
the composition $C_M$ comprises 63 atom-% Zr, 22 atom-% Ni and 15 atom-% Ti;
in cases when Al is present, the titanium fraction is reduced; and
the composition $C_E$ has compared with the composition $C_M$ an increased Ni fraction.

12. A pressure sensor, comprising:
an assembly having a first ceramic body; and a second ceramic body, wherein:
said first ceramic body and said second ceramic body are connected by means of a joint, said joint contains an active hard solder, or braze; said active hard solder, or braze, averaged over a continuous main volume, which includes at least 50%, of the volume of the joint, has an average composition $C_M$ with a liquidus temperature $T_l(C_M)$, wherein $C_M:=(c_{M1}, \ldots, c_{MN})$, wherein $|C_M|=1$, and wherein the $c_{Mi}$ are the stoichiometric fractions of the components $K_i$ $i=1, \ldots, N$ of the average composition of the active hard solder, or braze, in the main volume; and an edge region of said joint, which contacts at least one of said ceramic bodies and which overlaps no more than 8% of the main volume, has an average composition $C_E$ with a liquidus temperature $T_l(C_E)$, which lies not less than 20 K, above the liquidus temperature $T_l(C_M)$ of the average composition $C_M$ of the main volume, wherein $C_E:=(c_{E1}, \ldots, c_{EN})$, wherein $|C_E|=1$, and wherein the $c_{Ei}$ are the stoichiometric fractions of the components $K_i$ $i=1, \ldots, N$ of the average composition of the active hard solder, or braze, in the edge region; wherein:
said first ceramic body is a membrane body of a measuring membrane of the pressure sensor;
said second ceramic body is a platform of the pressure sensor; and
said platform and said measuring membrane are joined pressure-tightly with one another by means of said joint, which is ring-shaped.

13. The pressure sensor as claimed in claim 12; further having:
a capacitive transducer, wherein:
a surface of said platform facing said measuring membrane and/or the surface of said measuring membrane facing said platform, have, respectively, a metal electrode; and
said metal electrode comprises a metal, which is enriched in the composition $C_E$ in comparison to the composition $C_M$.

14. The pressure sensor as claimed in claim 13, wherein:
said metal, which the electrode comprises, comprises nickel.

15. A method for manufacturing an assembly, especially an assembly which comprises a first ceramic body and a second ceramic body, wherein the first ceramic body and the second ceramic body are to be joined by means of an active hard solder, or braze, the method comprises the steps of:
providing the active hard solder, or braze, and a solder stop between the ceramic bodies, wherein the active hard solder, or braze, has, averaged over a continuous main volume, which includes at least 50%, 90% of the volume of the active hard solder, or braze, an average composition $C_{M0}$ with a liquidus temperature $T_l(C_{M0})$, wherein $C_{M0}:=(c_{M01}, \ldots, c_{M0N})$, wherein $|C_{M0}|=1$, and wherein the $c_{Mi}$ are the stoichiometric fractions of the components $K_i$ $i=1, N$ of the average composition of the active hard solder, or braze, in the main volume, the solder stop has at least one material, whose liquidus temperature lies above the liquidus temperature of the composition $C_M$ of the main volume, and a mixing of the material of the solder stop with the composition $C_M$ leads, at least in the edge region of a joint to be formed by the method, to an average composition $C_E$, wherein the composition $C_E$ has a liquidus temperature $T_l(C_E)$, which lies not less than 20 K above the liquidus temperature $T_l(C_{M0})$ of the average composition $C_{M0}$ of the main volume, wherein $C_E:=(c_{E1}, \ldots, c_{EN})$, wherein $|C_E|=1$, and wherein the $c_{Ei}$ are the stoichiometric fractions of the components $K_i$ $i=1, \ldots, N$ of the average composition of the active hard solder, or braze, in the edge region; and
heating the ceramic bodies, the active hard solder, or braze, and the solder stop in a vacuum soldering, brazing process, at least up to melting of the composition $C_M$, wherein the melt in the edge region of the active hard solder, or braze, mixes with the material of the solder stop, whereby the melt in the edge region isothermally solidifies or becomes more viscous, and stops.

16. The method as claimed in claim 15, wherein:
the solder stop is provided by depositing a metal or a mixture of various metals on at least one surface section of at least one ceramic body; and
an enrichment of the metal or the mixture of metals in the active hard solder, or braze, leads to an increased liquidus temperature compared with the liquidus temperature of the composition of the main volume of the active hard solder, or braze.

17. The method as claimed in claim 16, wherein:
the surface section of the ceramic body, in which the solder stop is provided, overlaps the contact surface between the joint and the ceramic body no more than 25%, of the contact surface between the joint and the ceramic body.

18. The assembly as claimed in claim 1, wherein:
the main volume includes at least 70% of the volume of the joint.

19. The assembly as claimed in claim 1, wherein:
the main volume includes at least 80% of the volume of the joint.

20. The assembly as claimed in claim 1, wherein:
the edge region overlaps no more than 4% of the main volume.

21. The assembly as claimed in claim 1, wherein:
the edge region overlaps no more than 2% of the main volume.

22. The assembly as claimed in claim 1, wherein:
the edge region lies outside of the main volume.

23. The assembly as claimed in claim 1, wherein:
the composition $C_E$ of the edge region has a liquidus temperature $T_l(C_E)$, which lies not less than 50 K above the liquidus temperature $T_l(C_M)$ of the average composition $C_M$ of the main volume.

24. The assembly as claimed in claim 1, wherein:
the composition $C_E$ of the edge region has a liquidus temperature $T_l(C_E)$, which lies not less than 100 K above the liquidus temperature $T_l(C_M)$ of the average composition $C_M$ of the main volume.

25. The assembly as claimed in claim 1, wherein:
the edge region with the average composition $C_E$ has a volume, which amounts to not less than 0.5% of the volume of the joint.

26. The assembly as claimed in claim 1, wherein:
the edge region with the average composition $C_E$ has a volume, which amounts to not less than 1% of the volume of the joint.

27. The assembly as claimed in claim 15, wherein:
the composition $C_M$ has a liquidus temperature $T_l(C_M)$, which lies no more than 150 K above the liquidus temperature $T_l(C_e)$ of said eutectic point, respectively of said nearest intersection with said eutectic valley.

28. The assembly as claimed in claim 15, wherein:
the composition $C_M$ has a liquidus temperature $T_l(C_M)$, which lies no more than 50 K above the liquidus temperature $T_l(C_e)$ of said eutectic point, respectively of said nearest intersection with said eutectic valley.

29. The assembly as claimed in claim 18, wherein:
$s_{eE} < -0.5$.

30. The assembly as claimed in claim 18, wherein:
$s_{eE} < -0.8$.

31. The assembly as claimed in claim 24, wherein:
the composition $C_M$ comprises 63 atom-% Zr, 22 atom-% Ni and 15 atom-% Ti.

32. The assembly as claimed in claim 23, wherein:
the composition $C_M$ comprises 20 atom-% to 24 atom-% Ni, 13 atom-% to 17 atom-% Ti and remainder Zr, as well as, aluminum, which diffuses in the soldering process from the ceramic into said joint.

33. The assembly as claimed in claim 26, wherein:
the composition $C_M$ comprises 63 atom-% Zr, 22 atom-% Ni and 15 atom-% Ti; the titanium fraction is reduced; and the composition $C_E$ has compared with the composition $C_M$ an increased Ni fraction.

34. The pressure sensor as claimed in claim 28, wherein:
said average composition $C_M$ of said active hard solder, or braze is averaged over a continuous main volume, which includes at least 70% of the volume of the joint.

35. The pressure sensor as claimed in claim 28, wherein:
said average composition $C_M$ of said active hard solder, or braze is averaged over a continuous main volume, which includes at least 80% of the volume of the joint.

36. The pressure sensor as claimed in claim 28, wherein:
said edge region of said joint overlaps no more than 4% of the main volume.

37. The pressure sensor as claimed in claim 28, wherein:
said edge region of said joint overlaps no more than 2% of the main volume.

38. The pressure sensor as claimed in claim 28, wherein:
said edge region of said joint lies outside of the main volume.

39. The pressure sensor as claimed in claim 28, wherein:
said edge region of said joint has an average composition $C_E$ with a liquidus temperature $Tl(C_E)$, which lies not less than 50 K above the liquidus temperature $T_l(C_M)$ of the average composition $C_M$ of the main volume.

40. The pressure sensor as claimed in claim 28, wherein:
said edge region of said joint has an average composition $C_E$ with a liquidus temperature $Tl(C_E)$, which lies not less than 100 K above the liquidus temperature $Tl(C_M)$ of the average composition $C_M$ of the main volume.

41. The method as claimed in claim 38, wherein:
the active hard solder, or braze, has, averaged over a continuous main volume, which includes at least 70% and preferably of the volume of the active hard solder, or braze, said average composition $C_{M0}$.

42. The method as claimed in claim 38, wherein:
the active hard solder, or braze, has, averaged over a continuous main volume, which includes at least 90% and preferably of the volume of the active hard solder, or braze, said average composition $C_{M0}$.

43. The method as claimed in claim 38, wherein:
the composition $C_E$ has a liquidus temperature $T_l(C_E)$, which lies not less than 50 K above the liquidus temperature $T_l(C_{M0})$ of the average composition $C_{M0}$ of the main volume.

44. The method as claimed in claim 38, wherein:
the composition $C_E$ has a liquidus temperature $T_l(C_E)$, which lies not less than 100 K above the liquidus temperature $Tl(C_{M0})$ of the average composition $C_{M0}$ of the main volume.

45. The method as claimed in claim 44, wherein:
the surface section of the ceramic body, in which the solder stop is provided, overlaps the contact surface between the joint and the ceramic body no more than 10% of the contact surface between the joint and the ceramic body.

* * * * *